United States Patent Office 3,458,128
Patented July 29, 1969

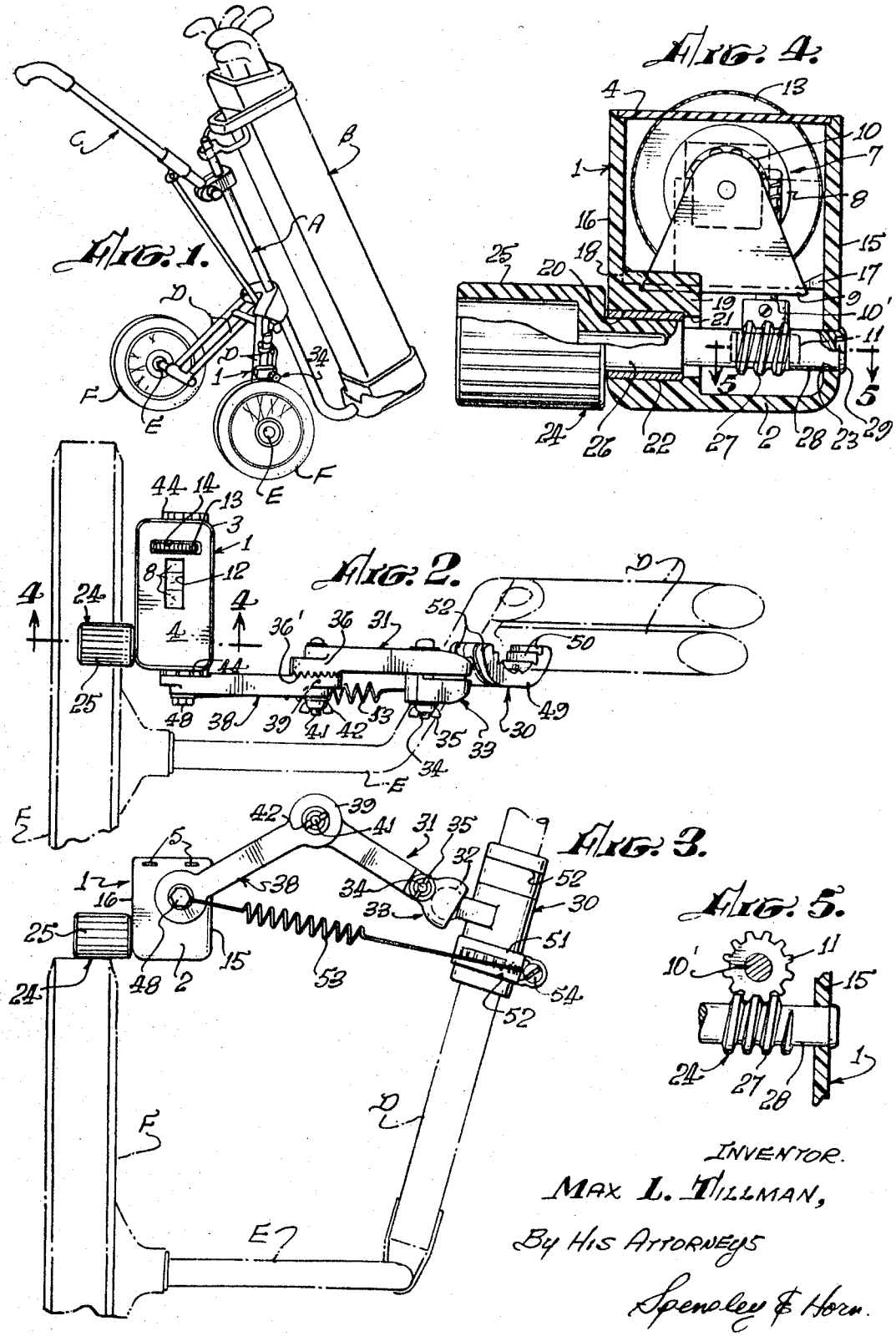

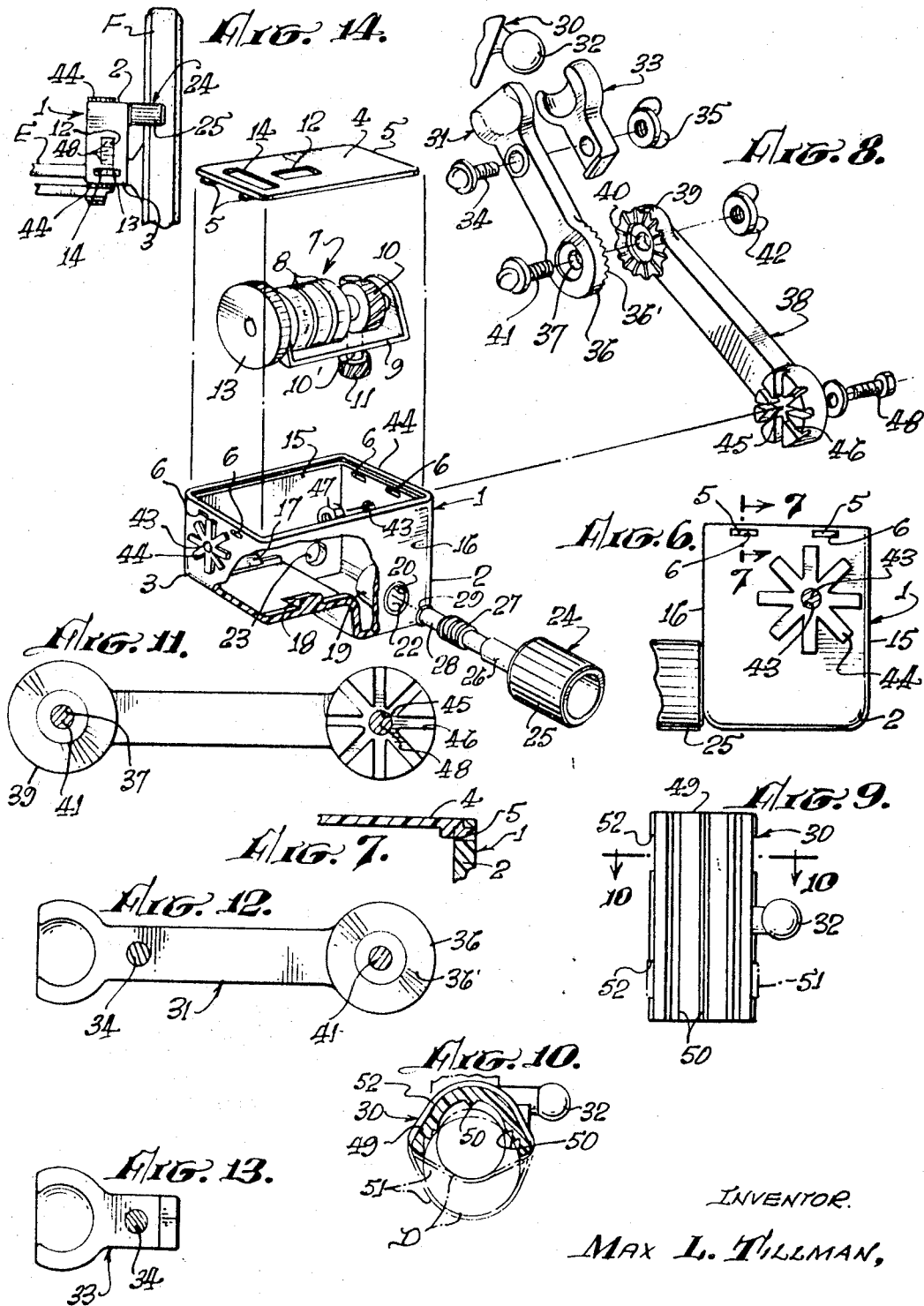

3,458,128
ODOMETER FOR GOLF CART
Max L. Tillman, Granada Hills, Calif., assignor to Sunbank Electronics, Inc., Burbank, Calif., a corporation of California
Filed Nov. 22, 1967, Ser. No. 685,150
Int. Cl. G01p 3/02
U.S. Cl. 235—95                                10 Claims

ABSTRACT OF THE DISCLOSURE

An odometer for use with golf carts comprising a counting device driven by reduction gearing extending to a friction roller or pulley which is maintained in contact with the periphery of the tire of a selected one of the golf cart wheels. An adjustable bracket means affords a wide range of adjustment to permit accommodation to various type of golf cart frame structures as well as to accommodate the direction of rotation of the golf cart wheel when the cart is to be pushed or pulled to provide driving operational rotational movement of the wheel contacting roller.

BACKGROUND OF THE INVENTION

Field of the invention

The field of the invention is that of distance measuring and particularly the measurement of the length of golf shots and of other distances helpful in the game.

Prior art

A device for the same purpose is disclosed in Patent 3,202,353.

SUMMARY OF THE INVENTION

The invention is directed to the provision of a golf cart odometer characterized by formation from few parts produced by plastic injection molding and except for those having adjustment requirements, being capable of snap-in assembly whereby the snap-in parts may be economically assembled and the other parts packed loosely therewith in the sales package with resultant economy in manufacturing costs and in the consequent selling price. Other objects and advantages will appear as the description of the preferred embodiment proceeds.

BRIEF DESCRIPTION OF THE DRAWINGS

In the attached drawings which form a part of the specification and which illustrate a presently preferred embodiment of the invention:

FIGURE 1 is a perspective view of a typical golf cart to which an odometer constituting a presently preferred embodiment of the invention has been applied, FIG. 2 is an enlarged top plan view of the device as applied to a golf cart of the type illustrated in FIGURE 1, the associated structure of the golf cart being indicated in broken lines, FIGURE 3 is a side elevational view of the device on the same scale as FIGURE 2 as viewed from the right hand side of a wheel in FIGURE 1 to which it is applied, the associated portions of the golf cart structure being shown in broken lines.

FIGURE 4 is a further enlarged, fragmentary sectional view taken on the lines 4—4 of FIGURE 2.

FIGURE 5 is a fragmentary plan view section taken on the line 5—5 of FIGURE 4.

FIGURE 6 is an end elevational view of the counter containing case or housing component, FIGURE 7 is a fragmentary sectional view taken on the lines 7—7 of FIGURE 6 showing the mode of interlock of the housing and its cover, FIGURE 8 is an exploded perspective view of the component parts of the invention, FIGURE 9 is a front elevational view of the cart frame engaging clamp component, FIGURE 10 is a sectional view taken on the line 10—10 of FIGURE 9, FIGURES 11, 12 and 13 are elevational views of the component members of the adjustable bracket means by which the odometer and its housing are supported in a desired position of use, and, FIGURE 14 is a top plan view showing the installation of the counter involving the positioning of the driving pulley for a rotation direction incident to application to a golf cart which is to be pushed rather than pulled.

DESCRIPTION OF PRESENTLY PREFERRED EMBODIMENT

Referring to the drawings, the illustrated embodiment of the invention is shown as applied to a common form of folding golf cart comprising a main frame member A provided with means for securing a golf club bag B thereto, said main frame member supporting a handle C and pairs of tubular metal arms D, D, each pair supporting an axle member E on which one each of the wheels F is mounted.

The illustrated embodiment of the invention comprises a counter case or housing 1 comprising a plastic molding of elongated rectangular configuration as viewed in plan and having one end 2 thereof of greater depth than the opposite end 3 to afford clearance for certain driving elements to be later described in detail. A cover 4 formed of a plastic molding having resilient characteristics has tongue elements 5 at each end thereof which are caused to engage rectangular opening section of the end walls of the case by first slightly bending the cover transversely its length and then allowing it to resume its normal flat position with the tongue elements 5 inserted in the opening 6 as best shown in FIGURE 7.

A counter unit, generally indicated at 7 is installed in the housing and includes a set of three dials mounted for rotation on a common shaft and inter-connected by a tens transfer mechanism, the shaft being journaled in a sheet metal frame 9 and being driven by a gear 10 meshing with a worm on the upper end of a vertical shaft 10' journaled in the base portion of the frame 9. Below said base portion, the shaft 10' carries a gear 11 by which it is driven by the mechanism of the present invention. The dials 8 are observable through an opening 12 in the cover 4 and the shaft on which the dials are mounted carries a toothed wheel 13 which is manually operable through an opening 14 in the cover 4 to reset the counter dials to zero. The above-described counter unit is a commercially available unit and the specific construction thereof forms no part of the present invention.

The counter unit is mounted on the bottom portion 3 of the housing and the inner faces of the housing side walls 15 and 16 slightly above the plane of the inner surface of the bottom portion 3 carry detent members 17 and 18 which extend parallel to and are spaced slightly above the said inner surface of the bottom portion 3 and the top surfaces of the detent members are downwardly and inwardly inclined. This permits the horizontal portion of the base member 9 to be snapped down past these two detents with resultant snap-in assembly of the counter unit in the housing, the resiliency of the plastic from which the housing is molded permitting this snap-in assembly and the resulting interlock is best illustrated in FIGURE 4 of the drawings. This assembly of the counter unit and housing positions the gear 11 in the bottom portion of the housing defined by the bottom 2 thereof. The inner face of the housing side wall 16 adjacent to the bottom portion 2 is provided with a thickened portion 19 through which a bore 20 extends, said bore terminating in a smaller axially aligned bore 21 and the juncture of the bores 20 and 21 forming a shoulder which is engaged by the inner end of a bushing 22 seated in the bore 20. The wall 15 carries a bore 23 which is of less diameter than the bore 21 and which is in axial alignment therewith, the axial line of said bores being in a horizontal plane which is substantially coincident with the central radial plane of the gear 11.

Journaled in the bearings formed by the bushing 22 and the bore 23 is the drive shaft component 24 formed of a single plastic molding and including a large diameter driving pulley end 25 adapted to engage a golf cart wheel tire, a large bearing portion, journaled portion 26 engaging the bushing 22, a shaft portion 26 carrying an integrally formed worm 27 having an outer diameter less than the inner diameter of the bushing 22 and driveably engaging the gear 11, said shaft portion constituting a journal engaging the bore 23 and terminating in an annular bead 29 only sufficiently larger than the bore 23 to permit it to be forced through said bore with a snap-in engagement, the said bead and the end face of the driving pulley 25 serving to limit end play of the shaft component. The counter unit includes a one-direction clutch means arranged to drive the dials to record the units which they are intended to record (in this instance, yards) in increasing progression and the two worm gear drives as well as the size of the pulley 25 are such that the units recorded are yards. As before noted, the housing, shaft unit, counter unit and cover are arranged for snap-in assembly, wherefore, the cost of manufacturing labor is greatly reduced.

The supporting means for the counter means above-described comprises an articulated bracket assembly comprising a cart number engaging base 30, a first arm 31 having one end releasably, clampingly engageable with a ball stud 32 formed integrally with said base by means of a concave socket in one end of said arm and an opposing, complementary clamp member 33 connected thereto by a bolt 34 and wing nut 35. The other end of said first arm is provided with a boss 36 formed with a generally circular face 36' disposed generally parallel to the length of said arm, said boss having a bore 37 extending therethrough normal to said face and said face have serrations projecting radially from said bore. A second arm 38 has one thereof provided with a serrated face boss 39 and a bore 40 extending centrally therethrough which are complementary to the boss and face 36 and 36' of the arm 31. A bolt 41 and wing nut 41 extending through the bores 37 and 40 serves to secure the arms 31 and 38 in any desired angular position determined by the engaged serrated faces thereof, the said faces serving to secure the arms against relative rotative movement about the bolt 41.

Some users prefer to pull a golf cart and others prefer to push the cart. Also different frame constructions may make it desirable for the bracket means to be attached at one end or other of the housing 1. Moreover, the distal end of the arm 38, may be required to be located at different angular relations with respect to the necessary horizontal attitude of the housing to maintain the driving pulley 25 rotatable about an axial line parallel to the axle of the golf cart wheel. To meet these considerations, the exterior surfaces of the ends of the housing 1 are provided with one each of a pair of holes 43 to receive a screw for attaching the distal end of the arm 38 and the exterior surfaces of the housing ends are provided with a plurality of ribs 44 having parallel sides, said ribs radiating from the center of the hold 43. The distal end of the arm 38 is provided with a screw receiving hole 45 and a circular face provided with a set of grooves 46 radiating from the center of the hole 45 in which the ribs 44 are received at any relative angular position determined by the interengagement of the said ribs and grooves. Within the housing, a nut 47 engages the screw 48 by which the housing is secured to the arm 38 without possibility of rotative movement about the axis of the screw.

It is believed to be obvious that the housing can be mounted with a driving pulley thereof in engagement with either golf cart wheel, and positioned as shown in FIGURES 1 and 14, for example, to establish driving relation to the counter dependent on whether the cart is to be pushed or pulled and that in either of those locations, the bracket means may be attached to the end of the housing most advantageously dependent on the cart frame structure by reason of the capability of rotation at the ball and socket end of the bracket arm, and that the members constituting the supporting bracket arm may be secured together and to the housing so that, in effect, the resulting arm is completely rigid and is rigidly connected to the housing.

There remains to be described in detail the base element 30 by which the entire unit is mounted on the golf cart frame. Golf cart frames are customarily formed of tubular metal members and those members vary considerably in diameter, the diameters being those of existing standard sizes of tubing. Any means for clampingly attaching the unit to a golf cart frame member must take this variation in tube size into account. The present invention meets this problem by forming the base member 30 with an open U-shaped tube engaging side 49 provided with parallel longitudinally extending teeth 50 at each side thereof so proportioned that each of the various standard sizes of tubing used for golf cart frame will be engaged by at least one of these teeth at each side. The base element 30 is formed to extend longitudinally of the transverse plane containing the ball stud 32 in each direction at least sufficient distances to enable one or two ordinary metal hose clamps such as indicated at 51 to extend around the outer surface of the base member in one or both of the grooves 52 formed thereon and thence across the exposed surface of the cart frame member, such as B, to which it may be applied. This forms a simple means of attachment which affords both radial and longitudinal adjustment of the base member 30 on the cart frame member and which is both economical to manufacture and capable of ready application to the golf cart.

To yieldingly maintain the driving pulley 25 in contact with the cart wheel and to accommodate irregularities in the contour of the cart wheel periphery, a tension spring 53 having one end attached to the hose clamp screw 54 and the other end attached to the screw 48 which secures the arm 48 to a housing may be employed, the spring being such relation to the bracket arm as to tend to urge the bracket arm and housing as a unit about the center of a ball and socket connection, the clamping of said ball and socket connection being sufficiently tight to eliminate any loose play and at the same time allow the force of the spring to maintain the driving pulley in proper frictional engagement with the golf cart wheel.

While the foregoing specification has disclosed a presently preferred embodiment of the invention by way of example, the invention is not to be deemed to be limited to the precise details of construction thus disclosed and it will be understood that the invention includes as well all such changes and modifications on the parts and the construction, combination and arrangement of parts as shall come within the spirit of the invention.

I claim:
1. An odometer attachment for use with golf carts comprising:
  (a) a counter mechanism having a driven component therein;

(b) a driving shaft operably engaged with said driven component;

(c) a housing means affording snap-in assembly for said counter mechanism and for a portion of said driving shaft, so that said shaft and said driven component are operably engaged as an incident to said snap-in assembly; and (d) a support bracket arm means having first and second ends, said first arm end being attached to the golf cart and said second arm end being optionally attachable at one of a plurality of locations on said housing and at one of a plurality of angular positions about a horizontal axial line extending through said housing in each of said locations.

2. An odometer attachment for golf carts as claimed in claim 1 in which there is a driving shaft pulley portion and at least one golf cart wheel, said pulley portion being disposed exteriorly of said housing and adapted to be placed in frictional engagement with the peripheral surface of one golf cart wheel.

3. A golf cart odometer attachment as claimed in claim 2 in which said driving shaft pulley portion and the portion of said shaft having said snap-in assembly with said housing cooperate with said housing to limit the extent of end play of said shaft.

4. A golf cart odometer attachment as claimed in claim 2 in which said shaft is journaled in opposite side walls of said housing, each of said side walls having a bearing portion therein, said shaft including an integrally formed worm between said bearing portions, said worm being of lesser major diameter than said bearing portion in the sidewall which is adjacent to said pulley portion and of greater diameter than said bearing portion in the opposite side wall, said worm is positioned for engagement with said driven component of said counter mechanism.

5. An odometer attachment for golf carts as claimed in claim 1 in which said housing is substantially rectangular and is provided with means for optional attachment of said bracket arm means at opposite, parallel exterior surfaces of said housing.

6. A golf cart odometer as claimed in claim 5 in which said bracket arm and said means for angular location of said bracket arm attachment on said housing have interengaging faces permitting selective angular positioning of said bracket relative to said housing and preventing relative angular movement therebetween when said bracket arm and said housing are attached to one another.

7. A golf cart odometer attachment as claimed in claim 1 in which said bracket arm means includes a base member attachable to a member of the golf cart frame structure and a multiple part arm having means at one end thereof for fixed attachment to said housing and having a ball and socket attachment to said base at its other end.

8. A golf cart attachment as claimed in claim 4 in which the parts constituting said bracket arm have interengaging end portions provided with complementary serrated faces and in which said serrated faces are secured in interengagement by a bolt extending through both of said arm parts, and in which the serrations of said faces are disposed radially with respect to the axial line of the connecting bolt affording capacity for relative angular interconnection of said parts about the axial line of said bolt.

9. An odometer attachment for golf carts comprising a housing supporting a counter mechanism and a driving pulley for said mechanism and at least one golf cart wheel having a tire thereon, said pulley being positioned and adapted for frictional engagement with the periphery of the tire of said golf cart wheel, a supporting bracket arm means for said housing having one end mountable on a selected portion of the golf cart frame and means at the other end of said bracket arm means affording selective attachment to said housing for placing said driving pulley in engagement with one golf cart wheel.

10. A golf cart odometer attachment as claimed in claim 9 in which said housing is substantially rectangular and has parallel opposite ends and in which said bracket arm means is securable optionally to opposite ends of said housing.

References Cited

UNITED STATES PATENTS

| | | | |
|---|---|---|---|
| 2,724,361 | 11/1955 | Coffin | 235—95 X |
| 2,766,935 | 10/1956 | Klein | 235—95 |
| 3,202,353 | 8/1965 | Nowak et al. | 235—95 |
| 3,250,466 | 5/1966 | Tomlinson | 235—95 |

STEPHEN J. TOMSKY, Primary Examiner

S. A. WAL, Assistant Examiner